Aug. 5, 1924.  1,503,499
F. M. HEINIG
TRACTION WHEEL TOOTH CLEANING DEVICE
Filed Nov. 6, 1922    2 Sheets-Sheet 2

INVENTOR.
Frank M. Heinig.
BY
Morsell + Keeney
ATTORNEYS.

Patented Aug. 5, 1924.

1,503,499

UNITED STATES PATENT OFFICE.

FRANK M. HEINIG, OF WATERTOWN, WISCONSIN.

TRACTION-WHEEL-TOOTH-CLEANING DEVICE.

Application filed November 6, 1922. Serial No. 599,454.

*To all whom it may concern:*

Be it known that I, FRANK M. HEINIG, a citizen of the United States, and resident of Watertown, in the county of Jefferson and State of Wisconsin, have invented new and useful Improvements in Traction-Wheel-Tooth-Cleaning Devices, of which the following is a description, reference being had to the accompanying drawings, which are a part of this specification.

This invention relates to improvements in traction wheels, and refers more particularly to the construction of the teeth of traction wheels.

It is one of the objects of this invention to provide means for keeping the teeth of traction wheels free from mud, dirt or other foreign matter.

A further object of the invention is to provide a traction wheel tooth cleaning device which is operated by the revolving of the traction wheel upon which it is mounted.

A further object of the invention is to provide a traction wheel tooth cleaning device which is so constructed that mud or other foreign matter cannot get between the device and the periphery of the wheel and thus prevent its efficient operation.

A further object of the invention is to provide means both simple and efficient and with which the ordinary traction wheel may easily be equipped.

With the above and other objects in view, the invention consists of the improved device for cleaning traction wheel teeth and its parts and combinations as set forth in the claims and all equivalents thereof.

In the accompanying drawings, in which the same reference characters indicate the same parts in all of the views.

Figure 1:
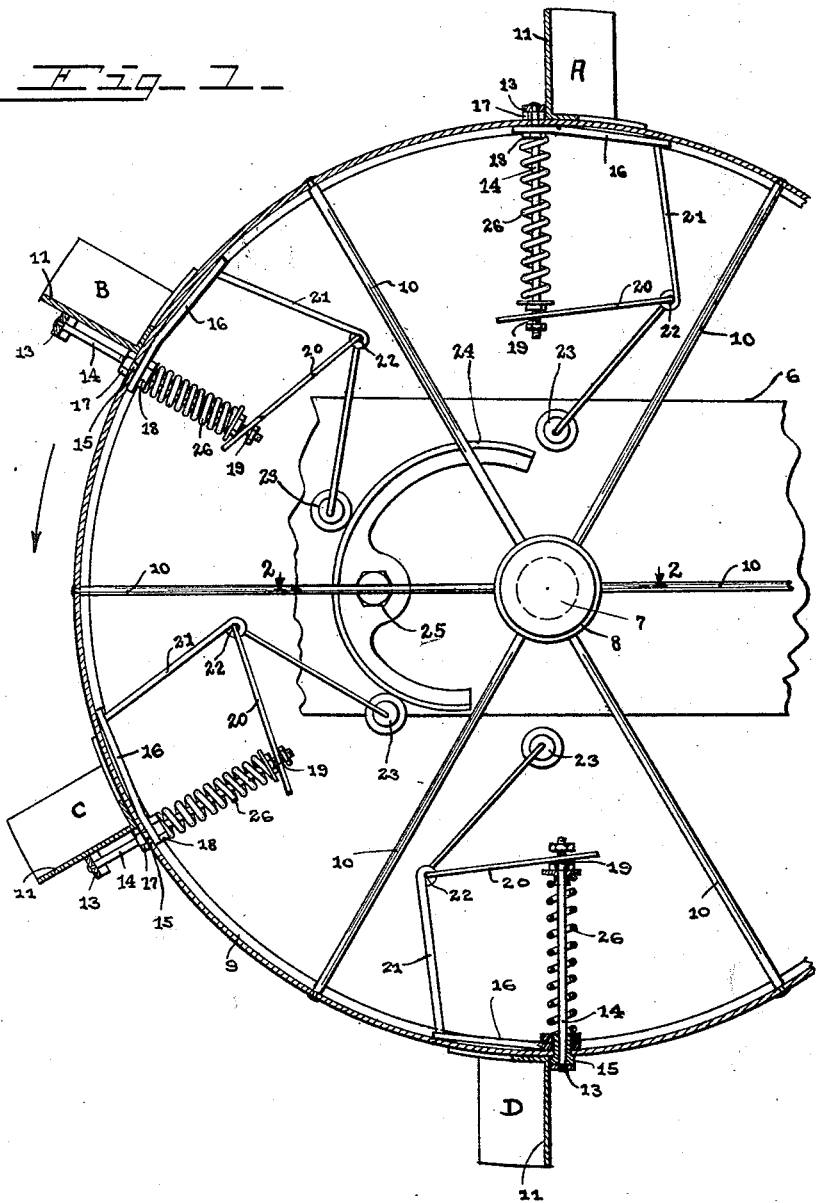
Fig. 1 is a view of a portion of the frame of a vehicle having connected thereto a traction wheel which is equipped with the improved means for freeing the traction wheel teeth from mud and other foreign matter, parts being broken away, and parts being shown in section.
Figure 2:
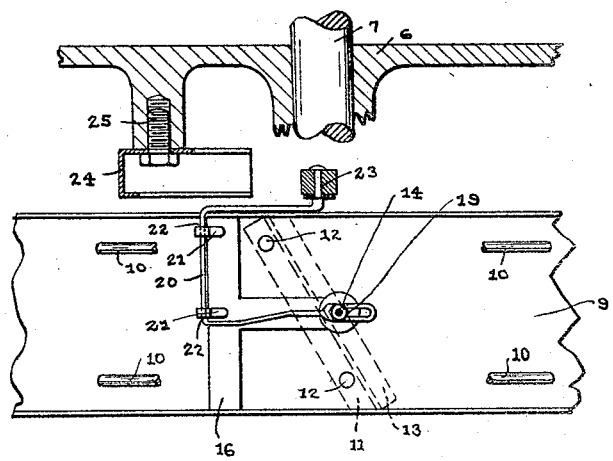
Fig. 2 is a sectional view taken on the line 2—2 of Fig. 1, parts being broken away.

Referring to the drawings, the numeral 6 represents a portion of the frame of a vehicle carrying an axle 7 on which is mounted a wheel 8. Said wheel consists of a rim 9 having the usual inwardly extending spokes 10 and secured to the outer peripheral surface of the rim 9 is a plurality of spaced-apart traction teeth 11, said teeth being right angular in cross section and secured to the rim by any suitable means, as rivets 12.

Figure 3:
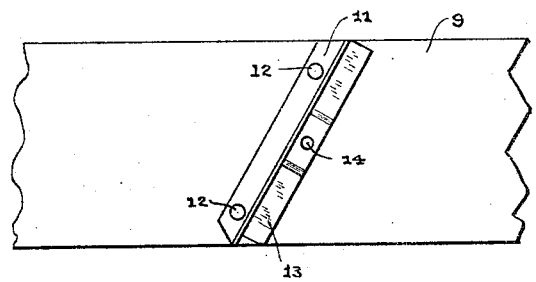
Fig. 3 is a top view of a portion of a traction wheel rim showing a tooth and the cleaning device in connection therewith.

The invention consists of plates 13 positioned adjacent the teeth 11, said plates having depressed center portions as shown in Fig. 3. Each of said plates has a plate rod 14 which passes through an aperture 15 in the rim and a registering aperture in a T-shaped plate 16 secured to the inner peripheral surface of the rim. Nuts 17 and 18, positioned on each side of the rim, form bearings through which the shaft 14 moves, and the inner portion of said shaft carries a coiled spring 26. The inner extremity of said shaft has connected thereto, as at 19, one arm of a substantially U-shaped crank 20. A pair of inwardly projecting hangers 21 which have one extremity secured to the T-shaped plate 16, pivotally support the mid portion of said crank 20, as at 22. The free arm of said crank carries a roller 23 which is adapted to roll over an arc-shaped track or eccentric member 24, said track being secured to and projecting outwardly from the frame of the vehicle by means of a bolt 25. Also, if desired, an ordinary spacer collar (not shown) may be interposed between the frame and said track so as to give it the correct position.

As has been set forth, track 24 is held in position only by means of bolt 25. With this arrangement, the bolt may be loosened and the track may be adjusted slightly around it to a position which will afford the most efficient operation of plate 13.

From the above description, it will be seen that the operation of the device is as follows: With the wheel rotating in the direction indicated by the arrow in Fig. 1, one of the rollers 23, which is nearest to the upper extremity of track 24 will ride upon the track to actuate the plate. The track is so positioned and shaped that the distance between it and the rim gradually decreases until its mid portion is reached, and then the distance between it and the rim increases more rapidly. Thus, it will be seen that as the roller 23 first moves over said track, it will be pushed upwardly, thereby moving the crank 20 and the plate rod 14 connected thereto. This will move plate 13 outwardly along the face of tooth 11, and coiled spring 26 will be contracted. The tooth designated A will show the position of the various parts when the roller is about to engage the track, while the tooth designated B illustrates the position when the plate is nearing the end of its outward movement. After the roller passes the mid portion of the track, the distance between the track and rim increases, and the expanding spring 26 will hold the roller to said track and move crank 20 and shaft 14 connected thereto inwardly. This will move the plate 13 inwardly along the face of the tooth, as shown by the tooth designated C. Tooth D shows the position of the parts after the roller leaves the track and they remain in that position for approximately half a revolution of the wheel and until the roller again rides upon the track. It will thus be seen that the movable plates are flush against the rim when the traction wheel teeth are engaging the ground and remain so until the teeth reach the top and commence to move toward the front of the wheel. Then, while the teeth are in the front portion of the wheel, the plates move out along the faces of the teeth freeing the same from mud or other foreign matter and allowing the same to drop free of the wheel. Hence, no foreign matter can get between the wheel rim and the movable plates to prevent the efficient operation thereof, and the foreign matter will always be removed from the face of the teeth.

From the foregoing description, it will be seen that the device is simple, efficient and easily constructed and is well adapted for the purpose described.

What I claim as my invention is:

The herein described device for a traction wheel having an opening through its rim, comprising a fixed tooth secured to the rim juxtaposed the opening, a plate member movable radially along the face of said fixed tooth and having a shank portion passing through said opening, means in connection with said shank portion for moving said plate member inwardly, and cam means for moving said plate member outwardly, said first mentioned plate moving means comprising a spring coiled about said shank portion and a crank connected to said shank and having a roller on one end which rides along the edge of said cam means.

In testimony whereof, I affix my signature.

FRANK M. HEINIG.